United States Patent
Shi

(10) Patent No.: US 9,360,730 B2
(45) Date of Patent: Jun. 7, 2016

(54) DISPLAY PANEL, METHOD FOR MANUFACTURING THE SAME, AND DISPLAY DEVICE COMPRISING THE SAME

(71) Applicant: BOE TECHNOLOGY GROUP CO., LTD., Beijing (CN)

(72) Inventor: Yue Shi, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 62 days.

(21) Appl. No.: 14/360,472

(22) PCT Filed: Dec. 16, 2013

(86) PCT No.: PCT/CN2013/089467
§ 371 (c)(1),
(2) Date: May 23, 2014

(87) PCT Pub. No.: WO2014/206031
PCT Pub. Date: Dec. 31, 2014

(65) Prior Publication Data
US 2015/0177584 A1  Jun. 25, 2015

(30) Foreign Application Priority Data

Jun. 26, 2013 (CN) .......................... 2013 1 0260354

(51) Int. Cl.
*G02F 1/155* (2006.01)
*G02F 1/153* (2006.01)
(Continued)

(52) U.S. Cl.
CPC ................ *G02F 1/157* (2013.01); *G02F 1/153* (2013.01); *G02F 1/1336* (2013.01);
(Continued)

(58) Field of Classification Search
CPC ................... G09G 3/3406; G09G 2320/0646; G09G 3/3413; G09G 3/3607; G09G 3/38; G02F 1/155; G02F 1/157; G02F 1/163; G02F 1/153; G02F 2001/1555; G02F 1/15; G02F 1/1523; G02F 1/1525; G02F 2001/1515; G02F 2001/1635; G02F 1/133514; G02F 1/1521; G02F 2001/1552; G02F 2001/1502; G02F 2001/1512; G02F 2001/1519; G02F 1/1336; G02F 1/1506
USPC ............... 359/265–274; 345/84, 90, 102, 105
See application file for complete search history.

(56) References Cited

U.S. PATENT DOCUMENTS 6,452,332 B1    9/2002  Moore
7,369,295 B2 *  5/2008  Morita .................... G02F 1/157
                                                        359/267

(Continued)

FOREIGN PATENT DOCUMENTS

CN    101371180 A    2/2009
CN    202008564 U    10/2011

(Continued)

OTHER PUBLICATIONS

Chinese Office Action of Chinese Application No. 201310260354.5, mailed Mar. 30, 2015 with English translation.
(Continued)

*Primary Examiner* — Evelyn A Lester
(74) *Attorney, Agent, or Firm* — Collard & Roe, P.C.

(57) ABSTRACT

A display panel, a method for manufacturing the display panel and a display device are provided. The display panel comprises a first transparent substrate (1) and a second transparent substrate (2) disposed opposite to the first transparent (1), the display panel further comprises a black matrix (3) disposed between the first transparent substrate (1) and the second transparent substrate (2), wherein the black matrix (3) together with the first transparent substrate (1) and the second transparent substrate (2) forms a plurality of pixel spaces separated from each other, electrochromatic material (4) disposed in each of the pixel spaces, and the display panel further comprises a first electrode and a second electrode, the plurality of pixel spaces being disposed between the first electrode and the second electrode. The method for manufacturing the display panel and the display device utilize the electrochromatic material instead of liquid crystals, thus having various advantages, such as a simple structure, simple manufacturing processes, low cost, good economic effect, good display effect and etc.

18 Claims, 1 Drawing Sheet

(51) Int. Cl.
   G09G 3/34 (2006.01)
   G02F 1/157 (2006.01)
   *G02F 1/15* (2006.01)
   *G02F 1/163* (2006.01)
   *G02F 1/1335* (2006.01)
   *G09G 3/38* (2006.01)
   *G02F 1/161* (2006.01)

(52) U.S. Cl.
   CPC .... *G02F 1/133512* (2013.01); *G02F 1/133514* (2013.01); *G02F 1/15* (2013.01); *G02F 1/155* (2013.01); *G02F 1/1506* (2013.01); *G02F 1/1521* (2013.01); *G02F 1/1523* (2013.01); *G02F 1/1525* (2013.01); *G02F 1/161* (2013.01); *G02F 1/163* (2013.01); *G02F 2001/1502* (2013.01); *G02F 2001/1512* (2013.01); *G02F 2001/1515* (2013.01); *G02F 2001/1519* (2013.01); *G02F 2001/1552* (2013.01); *G02F 2001/1555* (2013.01); *G02F 2001/1635* (2013.01); *G09G 3/3406* (2013.01); *G09G 3/3413* (2013.01); *G09G 3/38* (2013.01); *G09G 2320/0646* (2013.01)

(56) References Cited

U.S. PATENT DOCUMENTS

| | | | |
|---|---|---|---|
| 8,730,282 B2 * | 5/2014 | Bae | G09G 5/10 345/102 |
| 2011/0199666 A1 | 8/2011 | Chun et al. | |

FOREIGN PATENT DOCUMENTS

| | | |
|---|---|---|
| CN | 202013465 U | 10/2011 |
| CN | 102879946 A | 1/2013 |
| CN | 102944952 A | 2/2013 |
| CN | 103033996 A | 4/2013 |
| CN | 103323999 A | 9/2013 |
| JP | H06250233 A | 9/1994 |
| WO | 2012160768 A1 | 11/2012 |

OTHER PUBLICATIONS

English Translation of the International Search Report of PCT/CN2013/089467 published in English on Dec. 31, 2014.

International Search Report, International Preliminary Report on Patentability and Written Opinion of the International Searching Authority of PCT/CN2013/089467 in Chinese, mailed Mar. 20, 2014.

Jun, L., Li, F. (2012) "Optical Information Storage and Display Technology." Tsinghua University Press, 188-191, with English abstract.

Guoyu, Y. (2012) "Oxygen based cluster chemistry." Science Press, 843-850, with English abstract.

Second Chinese Office Action of Chinese Application No. 201310260354.5, mailed Aug. 20, 2015 with English translation.

English translation of the International Preliminary Report on Patentability and Written Opinion of the International Searching Authority of PCT/CN2013/089467, issued Dec. 29, 2015.

* cited by examiner

DISPLAY PANEL, METHOD FOR MANUFACTURING THE SAME, AND DISPLAY DEVICE COMPRISING THE SAME

TECHNICAL FIELD

Embodiments of the present disclosure relate to a technology field of display, and more particularly, relate to a display panel, a method for manufacturing the display panel and a display device comprising the display panel.

BACKGROUND

Among active display panels, liquid crystal display panels are widely used. However, if controlling transmittance of light through deflection of liquid crystal, both structures of the liquid crystal panels and manufacturing processes therefor are complex.

First of all, the liquid crystal panel needs an upper polarizer and a bottom polarizer to input and output polarized light. Otherwise, images cannot be displayed normally. However, this liquid crystal panel has a complex structure, needs additional processes (such as a process for attaching the polarizer) and is manufactured at a high cost. And moreover, the polarizer reduces effective utilization rate of a light source.

Secondly, an alignment film is further required as it is required to deflect all the liquid crystal of the whole panel uniformly, and additional components such as a spacer are further configured inside a layer of the liquid crystal. Thus, the structure and the manufacturing process are complicated further, and the cost is increased.

Thirdly, there is a problem of view angle in the liquid crystal panel. Although such problem has been solved by In Plane Switching (abbreviated as IPS) technology or ADvanced Super Dimension Switch (abbreviated as ADS) technology, processes of the IPS or ADSDS technology is very complex and the manufacturing cost is high.

In the ADS technology, a multi-dimensional electric field is formed with both an electric field generated at edges of slit electrodes in a same plane and an electric field generated between a slit electrode layer and a plate-like electrode layer, so that liquid crystal molecules at all orientations, which are located directly above the electrodes or between the slit electrodes in a liquid crystal cell, can be rotated, In this way, the work efficiency of liquid crystal can be enhanced and the light transmittance can be increased. The ADS technology can improve the image quality of the thin film transistor liquid crystal display and has advantages of high resolution, high transmittance, low power consumption, wide viewing angle, high aperture ratio, low chromatic aberration, high response speed, free of push Mura, etc.

Fourthly, due to chemical properties of the liquid crystal molecules, chemical pollution will occur during the manufacture and recycle of products, which are harmful to environment.

SUMMARY

Embodiments of the present disclosure provide a display panel comprising a first transparent substrate and a second transparent substrate facing to the first transparent substrate, and the display panel further comprising a black matrix disposed between the first transparent substrate and the second transparent substrate; wherein The black matrix together with the first and second transparent substrates form a plurality of pixel spaces separated from each other;

In each of the pixel spaces, electrochromatic material is disposed;

the display panel further comprising a first electrode and a second electrode, the plurality of pixel spaces are disposed between the first and the second electrodes.

The first electrode is disposed on a position of the first transparent substrate corresponding to each of the pixel spaces, the second electrode is disposed on a position of the second transparent substrate corresponding to each of the pixel spaces, and transmissivity of the electrochromatic material is changed by changing a voltage difference between the corresponding first electrode and the corresponding second electrode.

The first electrode is a common electrode and covers a display region of the first transparent substrate; and the second electrode is disposed on a position of the second transparent substrate corresponding to each of the pixel spaces.

Further, patterns of color filters are disposed on the first transparent substrate or the second transparent substrate, the colors of the color filters corresponding to colors of the electrochromatic material filled in the corresponding pixel space after a voltage is applied to the display panel.

Further, the electrochromatic material is an organic electrochromatic material, an inorganic electrochromatic material or a composite electrochromatic material.

Embodiments of the disclosure provide a display device, which comprises the display panel as described above.

The display device according to the disclosure further comprises a backlight source, wherein the display panel is disposed at a light-exiting side of the backlight source.

Embodiments of the disclosure also provide a method for manufacturing a display panel, which comprises:

Step 1, providing a first transparent substrate and a second transparent substrate, respectively, disposing a first electrode on the first transparent substrate and disposing a second electrode on the second transparent substrate;

Step 2, disposing a black matrix on the first transparent substrate or the second transparent substrate;

Step 3, filling an electrochromatic material into openings of the black matrix;

Step 4, cell-assembling the first transparent substrate and the second transparent substrate in vacuum, wherein the black matrix is disposed between the first transparent substrate and the second transparent substrate.

Further, in step 2, the black matrix is disposed on a surface of the first transparent on which the first electrode is disposed, or the black matrix is disposed on a surface of the second transparent on which the second electrode is disposed.

Further, in step 4, after cell-assembling the first and the second transparent substrate in vacuum, the first electrode and the second electrode face to each other.

Further, after step 2 and before step 3, the method comprises a step M of disposing patterns of color filters in each of pixel spaces on the first transparent substrate or the second transparent substrate.

Further, the electrochromatic material is filled in step 3 through a one drop filling process or an inkjet process.

Advantageous effects of the display panel, the method for manufacturing the same, and the display device according to embodiments of the disclosure.

Firstly, the display panel according to embodiments of the disclosure controls transmissivity of light by means of transmitting and reflecting light at different degrees due to an oxidation-reduction reaction of the electrochromatic material under effect of currents, and presents multiple grayscales. With respect to conventional liquid crystal display panel, the display panel according to embodiments of the disclosure can change path of lights without upper and lower polarizers so as to present multiple grayscales, thus having a simple structure. At the same time, process steps such as attaching polarizers can be omitted, and the display panel can be manufactured easily and at a low cost. And meanwhile, luminance of a light source can be decreased.

Secondly, in the display panel according to embodiments of the disclosure, as an electrochromatic material is used to present multiple grayscales and the electrochromatic material is sealed in each of the pixel spaces, there is no need for an orientation film to control deflection of liquid crystal molecules. And at the same time, as a black matrix is used to support the first transparent substrate and the second transparent substrate, a spacer is no longer needed for supporting. Thus, the structure of and the manufacturing process for the display panel are further simplified.

Thirdly, the display panel according to embodiments of the disclosure has no problem with view angles and has a better display effect.

Fourthly, the display panel according to embodiments of the disclosure, utilize electrochromatic material to present multiple grayscales, thus producing less pollution and being environmental-friendly with respect to poisonous liquid crystal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. In the drawings.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
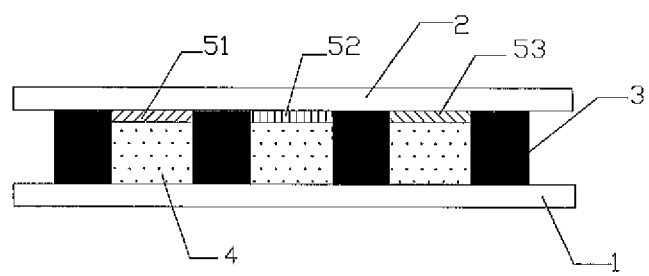
FIG. 1 is a schematic sectional view of a display panel according to some embodiments of the disclosure.

FIG. 1 illustrates a display panel according to some embodiments of the disclosure. The display panel comprises an upper transparent substrate 2, a lower transparent substrate 1, and a black matrix 3 disposed between the upper transparent substrate 2 and the lower transparent substrate 1. The black matrix 3 defines a plurality of pixel spaces separated from each other between the upper transparent substrate 2 and the lower transparent substrate 1.

In a liquid crystal panel, the black matrix is provided to serve as light-shading strips between color filters of different colors and to shade gates lines and/or data lines. While in the embodiments of the disclosure, the black matrix not only serves as light-shading strips between patterns of color filters of different colors but also has a height equal to a distance between the upper transparent substrate and the lower transparent substrate. Thus, the black matrix together with the upper transparent substrate and the lower transparent substrate form the plurality of closed pixel spaces separated from each other. And at the same time, the black matrix is also be used to support the upper and lower transparent substrates. That is, the black matrix has multiple functions, and hence the structure of the display panel is simplified.

In each of the pixel spaces, electrochromatic material 4 is provided. Under effect of electric fields, an oxidation-reduction reaction occurs to the electrochromatic material 4, and the transmissivity and reflectivity of the electrochromatic material 4 are changed. And thus, luminance of output light is changed and different grayscales, such as grayscales of 0 to 255, are presented through controlling the voltage to be different values. So, instead of the liquid crystal, the electrochromatic material is used for display.

Electrodes are provided on the upper transparent substrate and the lower transparent substrate, respectively. The electrodes provided on the upper transparent substrate and the lower transparent substrate form an independent electric field for each of the pixel spaces.

According to some embodiments, voltage across two ends of the electrochromatic material are changed through changing voltage difference between the upper transparent substrate and the lower transparent substrate, and thus light transmissivity of each pixel is changed and various grayscales are achieved.

There are many manners for controlling voltage difference across two ends of each pixel by means of the electrodes provided on the upper transparent substrate and the lower transparent substrate. Two manners taken as examples are described as below.

The first manner the electrodes comprise a plurality of first electrodes and a plurality of second electrodes.

The first electrode corresponds to each of the pixel spaces, respectively, and is disposed on a position of the upper transparent substrate 2 corresponding to each of the pixel space;

The second electrode corresponds to each of the pixel spaces, respectively, and is disposed on a position of the lower transparent substrate 1 corresponding to each of the pixel space.

For example, the first electrode and the second electrode are transparent electrodes made of a same material (such as Indium Tin Oxides (ITO), Indium Zinc Oxide (IZO) and the like) and having a same structure. For example, the first electrode and the second electrode are provided on the substrates in a manner of matrix corresponding to arrangement of pixels. In a scanning period, a driving circuit makes voltage differences between the first electrode and the second electrode corresponding different pixels to be different, and the electrochromatic material has different light transmissivities under different voltage differences, and thus different grayscales are presented and the desired image is displayed.

The first electrode is disposed on a side of the upper transparent substrate 2 facing to the lower transparent substrate 1, and the second electrode is disposed on a side of the lower transparent substrate 1 facing to the upper transparent substrate 2.

The second manner: the electrodes comprise a first electrode provided on one of the upper and lower transparent substrates and a plurality of second electrodes provided on the other of the upper and lower transparent substrates.

The first electrode is a common electrode, and is a single electrode covering all display region of one of the transparent substrates.

The second electrodes are disposed on the other of the transparent substrates and correspond to each of the pixel spaces, respectively. In operation, a common voltage is supplied to the common electrode and various voltages are supplied to the second electrodes corresponding to different pixels, thus voltage differences corresponding to different pixels are independently controlled. Therefore, the grayscale presented by each pixel is controlled through controlling electrochromatic material in each pixel space.

The first electrode is disposed on a side of one of the transparent substrates facing to the other of the transparent substrates, and the second electrode is disposed on a side of the other of the transparent substrates facing to the one of the transparent substrates.

According to some embodiments, patterns of color filters of different colors are provided to present a color image. The color image is displayed under effect of light mixing. For example, patterns of color filters of three primary colors of Red, Green and Blue (R/G/B) are provided in the display panel. The patterns of color filters of R/G/B are disposed in each of the pixel space, and are provided on the upper transparent substrate 2 or the lower transparent substrate 1 in each of the pixel space. It should be explained that, patterns of color filters of other colors (such as transparent color, yellow, and the like) other than R/G/B are also be used according to actual requirements, and embodiments of the disclosure are not limited hereto.

As illustrated in FIG. 1, taking a case that patterns of color filters of three colors R/G/B are disposed on the upper transparent substrate, pattern of a red color filter 51, pattern of a green color filter 52 and pattern of a blue color filter 53 are distributed in each of the pixel spaces and are disposed on the lower surface of the upper transparent substrate 2.

The oxidation-reduction reaction of the electrochromatic material 4 is reversible, and the electrochromatic material 4 are used to display various images responding to refresh of pixels. Further, the electrochromatic material 4 has no problem of view angles that occurs due to so-called long axis and short axis of liquid crystal molecules, and thus the electrochromatic material 4 has a better display effect. And meanwhile, elements and manufacturing processes that are needed for increasing the view angles are omitted. Thus, the display panel can be manufactured at a low cost. In addition, compared to the poisonous liquid crystal molecules, the electrochromatic material 4 has advantages of less pollution and being environmental-friendly.

The display panel according to the embodiments of the invention has multiple advantages, such as a simple structure, capable of being manufactured at low cost, a better display effect and the like.

According to some embodiments of the invention, a display panel comprises an upper transparent substrate, a lower transparent substrate and a black matrix disposed between the upper transparent substrate and the lower transparent substrate.

The black matrix forms a plurality of pixel spaces between the upper transparent substrate and the lower transparent substrate;

Electrochromatic material is disposed in the pixel spaces.

The display panel further comprises electrodes disposed on the upper transparent substrate and the lower transparent substrate, respectively, the electrodes are used to generate an electric field for each of the pixel spaces.

Light transmissivity of the electrochromatic material is changed by changing voltage difference between electrodes disposed on the upper transparent substrate and the lower transparent substrate.

Patterns of color filters of R/G/B are disposed on the lower surface of the upper transparent substrate or the upper surface of the lower transparent substrate in each of the pixel spaces. After a voltage is applied, the electrochromatic material disposed in each pixel space presents a color which corresponds to the color of the color filter disposed in the pixel space.

It should be understood that, patterns of color filters of other colors other than R/G/B are also used according to actual requirements, such as a transparent color, yellow, and the like, and embodiments of the disclosure are not limited to hereto.

For example, the electrochromatic material is an organic electrochromatic material, an inorganic electrochromatic material or a composite electrochromatic material.

The organic electrochromatic material comprises one or more of polythiophene materials and its derivants, Viologen materials, tetrathiafulvalene, metal phthalocyanine and polyaniline.

The inorganic electrochromatic material comprises one or more of tungsten trioxide ($WO_3$), molybdenum trioxide ($MoO_3$) and vanadium pentoxide ($V_2O_5$).

The composite electrochromatic materials refer to a composite material comprising organic electrochromatic material and inorganic electrochromatic material.

The electrochromatic materials are drawn widely and easily available. Thus, the manufacture steps are further simplified.

According to some embodiments, a display device is provided. The display device comprises the display panel as described above. The display device is applicable to any product or component that has a function of display, such as a cell phone, a tablet PC, a TV set, a display apparatus, a laptop, a digital frame, a navigating instrument, and the like. The product or component utilizing the display device according to the embodiments of the disclosure has various advantages, such as a simple structure, being manufactured easily and at a low cost, yielding good economic return, a better display effect, and the like.

The display panel according to the embodiments of the disclosure is applicable to an active display device. Therefore, the display device according to the embodiments of the disclosure further comprises a backlight source, wherein the display panel is disposed at a side of the backlight source from which light exits.

Figure 2:
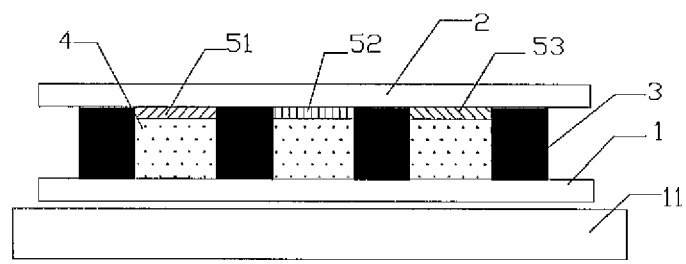
FIG. 2 is a schematic sectional view of a display device according to some embodiments of the disclosure.

As illustrated in FIG. 2, the display device comprises a backlight source 11 and the display panel as described above. The display panel illustrated in FIG. 2 comprises an upper transparent substrate 2, a lower transparent substrate 1, a black matrix 3 and electrochromatic material 4, wherein the electrochromatic material 4 is disposed in a plurality of closed pixel spaces surrounded by the black matrix 3, the upper transparent substrate 2 and the lower transparent substrate 1, the closed pixel spaces are separated from each other. The display device according to this embodiment further comprises patterns of color filters, such as pattern of red color filter 51, pattern of green color filter 52 and pattern of blue color filter 53. As illustrated in FIG. 2, patterns of the color filters are disposed on the lower surface of the upper transparent substrate 2. Patterns of the color filters are also be disposed on the lower transparent substrate 1. The patterns of the color filters correspond to the pixel spaces, and the color of the color filter corresponds to a color into which the electrochromatic material filled in the pixel space is changed after the voltage is applied.

Unlike conventional active display devices, the display device according to the embodiments presents multiple grayscales and displays images by utilizing electrochromatic materials that control light transmissivity through oxidation-reduction reaction, and thus has multiple advantages, such as a simple structure, easy to use, a simple manufacturing process, being manufactured at a low cost, a better display effect, and the like.

According to some embodiments, a method for manufacturing a display panel is provided. The method comprises the following steps:

Step 1, providing an upper transparent substrate and a lower transparent substrate, respectively, providing a first electrode on the lower surface of the upper transparent substrate and providing a second electrode on the upper surface of the lower transparent substrate.

The upper and lower transparent substrates are made of glass, quartz, transparent plastic and the like. Both the first and second electrodes are made of transparent conductive materials, such as ITO, IZO and the like. The first and second electrodes are provided on the upper and lower transparent substrates by a normal process. If the electrode has a layer structure all over the substrate without patterns, it is formed by deposition, coating, sputtering and the like. If the electrode has a patterned structure, desired patterns are formed through a patterning process, which comprises coating photoresist, exposing, development, etching, peeling photoresist and the like.

Step 2: providing a black matrix on the lower surface of the upper transparent substrate or the upper surface of the lower transparent substrate.

The black matrix is made of Chromium (Cr) metal or black photosensitive resin material. If the black matrix is made of black photosensitive resin material, the resin material is exposed directly and developed. Thus, patterns of the black matrix are formed. If the black matrix is made of Cr, a layer of Cr is formed by means of deposition, coating, sputtering and the like and then patterns of the black matrix is formed through a patterning process.

Step 3: providing electrochromatic material on the substrate provided with the black matrix.

The transparent substrate and the black matrix provided on the transparent substrate form pixel spaces with openings at one side, and the electrochromatic material are filled into the pixel spaces through the openings.

According to some embodiments, two manners for filling the electrochromatic material are provided.

The first one is one drop filling (ODF) process by which electrochromatic material in liquid state is dropped into each of the pixel spaces, and the second one is inkjet process by which electrochromatic material is filled into each of the pixel spaces.

Step 4, cell-assembling the upper and lower transparent substrates in vacuum, the black matrix being disposed between the upper transparent substrate and the lower transparent substrate.

The upper transparent substrate and the lower transparent substrate are cell-assembled in vacuum. Thus, the electrochromatic material is sealed in the pixel spaces and the display panel with fixed package is formed.

The pixel spaces are closed and separated from each other through the steps mentioned above so as to form the display panel according to the embodiments of the disclosure. The electrochromatic material is conducted and a current flow is generated by applying different voltages to the first and second electrodes so as to produce a voltage difference between the first and second electrodes. A reversible oxidation-reduction reaction occurs to the electrochromatic material due to gain and loss of electrons and compositions of the electrochromatic material itself changes, such that various transmissivity and reflection effects can be produced and multiple grayscales can be achieved. Compared to liquid crystal display panels in which directions of light are changed by means of rotation characteristics of liquid crystal molecules and multiple grayscales are achieved through filtering of polarizers, the display panel according to embodiments of the disclosure has a simple structure without polarizers, spacers and alignment films. Thus, the display panel according to embodiments of the disclosure can be easily manufactured with fewer processes and has a better display effect.

According to some embodiments of the disclosure, a method for manufacturing a display panel is provided. The method comprises the following steps.

Step 1, providing an upper transparent substrate and a lower transparent substrate, respectively, providing a first electrode on the lower surface of the upper transparent substrate and providing a second electrode on the upper surface of the lower transparent substrate;

Step 2, providing a black matrix on the lower surface of the upper transparent substrate or the upper surface of the lower transparent substrate.

Step M, providing color filters on the upper transparent substrate or on the lower transparent substrate, wherein patterns of the color filters correspond to openings of the black matrix, a color of the color filter correspond to a color into which the electrochromatic material filled in the opening of the black matrix changes after the voltage is applied;

Step 3, filling electrochromatic material to the openings of the black matrix through an ODF process or an inkjet process;

Step 4, cell-assembling the upper and lower transparent substrates in vacuum, wherein the black matrix is disposed between the upper transparent substrate and the lower transparent substrate.

In this method, steps 1 to 4 are the same as the above-described method, and description thereof will not be repeated here.

The difference between this method and the above-described method lies in that, this method comprises a step M after step 2 and before step 3. Color display is achieved by disposing patterns of color filters. If patterns of color filters are disposed on the upper transparent substrate and on the lower surface of the upper transparent substrate, the pattern of the color filter corresponds to an opening of the black matrix and a color of the color filter corresponds to a color into which the electrochromatic material filled in the opening changes after the voltage is applied. If patterns of the color filters are disposed on the lower transparent substrate and on the upper surface of the lower transparent substrate, the patterns of the color filters are arranged in each of the pixel spaces. Light filtered by patterns of color filters of different colors form a desired color image under effect of lights mixing.

Patterns of color filters of three colors R/G/B are used in a display panel. It should be understood that, instead of patterns of color filters of three colors R/G/B, patterns of color filters of other colors, such as transparent color, yellow and the like, are used, and the embodiments of the disclosure are not limited thereto.

Methods for forming patterns of color filters are as follows. After a layer of color filter is formed by means of deposition, coating, sputtering and the like, processes such as exposing and development are used to form patterns of color filters.

As a modification to this method, a step N is comprised after step M and before step 3.

Step N: forming a protection layer for the patterns of color filters. The patterns of color filters are protected effectively by means of arranging the protection layer. Thus, life of the patterns of color filters is prolonged so as to guarantee excellent display effect of the display panel in a long time.

The protection layer is disposed on the whole substrate on which patterns of color filters are provided by means of deposition, coating, sputtering and the like.

Compared to methods for manufacturing the liquid crystal panel, the method for manufacturing the display panel according to the embodiments of the disclosure has simple process and less process steps, and can be performed easily. Thus, the method can be performed at a low cost and has a good economic effect and high productivity.

The foregoing are merely exemplary embodiments of the disclosure, but are not used to limit the protection scope of the disclosure. The protection scope of the disclosure shall be defined by the attached claims.

The invention claimed is:

1. A display panel comprising:
a first transparent substrate;
a second transparent substrate facing to the first transparent substrate;
a black matrix disposed between the first transparent substrate and the second transparent substrate, wherein the black matrix together with the first and second transparent substrates form a plurality of pixel spaces separated from each other;
electrochromatic material disposed in each of the plurality of pixel spaces;
a first electrode and a second electrode, wherein the plurality of pixel spaces are disposed between the first and the second electrodes; and
wherein patterns of color filters are disposed on the first transparent substrate or the second transparent substrate;
the patterns of the color filters correspond to openings of the black matrix; and
the colors of the color filters correspond to colors of the electrochromatic materials filled in the openings of the black matrix after a voltage is applied to the display panel.

2. The display panel according to claim 1, wherein the first electrode is disposed on a position of the first transparent substrate corresponding to each of the pixel spaces;
the second electrode is disposed on a position of the second transparent substrate corresponding to each of the pixel spaces; and
transmissivity of the electrochromatic material is changed by changing a voltage difference between the corresponding first electrode and the corresponding second electrode.

3. The display panel according to claim 2, wherein the first electrode is disposed on a side of the first transparent substrate facing to the second transparent substrate, and the second electrode is disposed on a side of the second transparent substrate facing to the first transparent substrate.

4. The display panel according to claim 3, wherein
patterns of color filters are disposed on the first transparent substrate or the second transparent substrate;
the patterns of the color filters correspond to openings of the black matrix; and
the colors of the color filters correspond to colors of the electrochromatic materials filled in the openings after a voltage is applied to the display panel.

5. The display panel according to claim 1, wherein
the first electrode is a common electrode and covers a display region of the first transparent substrate; and
the second electrode is disposed on a position of the second transparent substrate corresponding to each of the pixel spaces.

6. The display panel according to claim 5, wherein the first electrode is disposed on a side of the first transparent substrate facing to the second transparent substrate, and the second electrode is disposed on a side of the second transparent substrate facing to the first transparent substrate.

7. The display panel according to claim 5, wherein
patterns of color filters are disposed on the first transparent substrate or the second transparent substrate;
the patterns of the color filters correspond to openings of the black matrix; and
the colors of the color filters correspond to colors of the electrochromatic materials filled in the openings after a voltage is applied to the display panel.

8. The display panel according to claim 1, wherein the electrochromatic material is an organic electrochromatic material, an inorganic electrochromatic material, or a composite electrochromatic material.

9. The display panel according to claim 8, wherein the organic electrochromatic material comprises one or more of polythiophene materials and its derivants, Viologen materials, tetrathiafulvalene, metal phthalocyanine and polyaniline.

10. The display panel according to claim 8, wherein the inorganic electrochromatic material comprises one or more of tungsten trioxide ($WO_3$), molybdenum trioxide ($MoO_3$) and vanadium pentoxide ($V_2O_5$).

11. A display device comprising a display panel according to claim 1.

12. The display device according to claim 11, further comprising a backlight source, wherein the display panel is disposed at a light exiting side of the backlight source.

13. A method for manufacturing a display panel, comprising the following steps:
providing a first transparent substrate and a second transparent substrate, respectively,
disposing a first electrode on the first transparent substrate and disposing a second electrode on the second transparent substrate;
disposing a black matrix on the first transparent substrate or the second transparent substrate;
disposing patterns of color filters on the first transparent substrate or on the second transparent substrate, the patterns of the color filters corresponding to the openings of the black matrix, colors of the color filters corresponding to colors of the electrochromatic materials filled into the openings of the black matrix after a voltage applied to the display panel;
filling an electrochromatic material into openings of the black matrix; and
cell-assembling the first transparent substrate and the second transparent substrate in vacuum, wherein the black matrix is disposed between the first transparent substrate and the second transparent substrate.

14. The method according to claim 13, wherein, in step 2, the black matrix is disposed on a surface of the first transparent substrate on which the first electrode is disposed, or the black matrix is disposed on a surface of the second transparent substrate on which the second electrode is disposed.

15. The method according to claim 13, wherein, in step 4, after cell-assembling the first transparent substrate and the second transparent substrate in vacuum, the first electrode and the second electrode face to each other.

16. The method according to claim 13, wherein, after the step of disposing patterns of color filters and before the step of filling an electrochromatic material, the method further comprises the step of:
providing a protection layer for the patterns of the color filters.

17. The method according to claim 13, wherein the electrochromatic material is filled through an ODF process or an inkjet process.

18. The display panel according to claim 2, wherein
patterns of color filters are disposed on the first transparent substrate or the second transparent substrate;
the patterns of the color filters correspond to openings of the black matrix; and
the colors of the color filters correspond to colors of the electrochromatic materials filled in the openings after a voltage is applied to the display panel.

* * * * *